(12) United States Patent
Patel

(10) Patent No.: US 7,754,393 B2
(45) Date of Patent: Jul. 13, 2010

(54) MODULAR FUEL-CELL STACK ASSEMBLY

(75) Inventor: Pinakin Patel, Danbury, CT (US)

(73) Assignee: FuelCell Energy, Inc., Danbury, CT (US)

(*) Notice: Subject to any disclaimer, the term of this patent is extended or adjusted under 35 U.S.C. 154(b) by 197 days.

(21) Appl. No.: 11/970,411

(22) Filed: Jan. 7, 2008

(65) Prior Publication Data

US 2008/0171257 A1 Jul. 17, 2008

Related U.S. Application Data

(62) Division of application No. 10/916,235, filed on Aug. 11, 2004, now Pat. No. 7,323,270.

(51) Int. Cl.
*H01M 8/02* (2006.01)
*H01M 8/24* (2006.01)

(52) U.S. Cl. ...................... 429/459; 429/471

(58) Field of Classification Search .............. 429/38, 429/39
See application file for complete search history.

(56) References Cited

U.S. PATENT DOCUMENTS

| | | | |
|---|---|---|---|
| 1,967,781 A | 7/1934 | Potter et al. | |
| 3,101,930 A | 8/1963 | Huet | |
| 3,278,336 A | 10/1966 | Uline et al. | |
| 4,225,654 A | 9/1980 | Tajima et al. | |
| 4,719,157 A | 1/1988 | Tsutsumi et al. | |
| 4,853,301 A | 8/1989 | Granata et al. | |
| 5,009,968 A | 4/1991 | Guthrie et al. | |
| 5,212,022 A | 5/1993 | Takahashi et al. | |
| 5,324,565 A | 6/1994 | Leonida et al. | |
| 5,688,610 A | 11/1997 | Spaeh et al. | |
| 5,856,034 A | 1/1999 | Huppmann et al. | |
| 5,914,200 A | 6/1999 | Schabert et al. | |
| 6,106,964 A | 8/2000 | Voss et al. | |
| 6,110,612 A | 8/2000 | Walsh | |
| 6,318,066 B1 | 11/2001 | Skowronski | |
| 6,582,842 B1 | 6/2003 | King | |
| 6,692,859 B2 | 2/2004 | Mukerjee et al. | |
| 6,752,937 B2 | 6/2004 | Butler | |

(Continued)

FOREIGN PATENT DOCUMENTS

JP 60-105177 6/1985

(Continued)

*Primary Examiner*—Stephen J. Kalafut
(74) *Attorney, Agent, or Firm*—Cowan, Liebowitz & Latman, PC

(57) ABSTRACT

A fuel cell assembly having a plurality of fuel cells arranged in a stack. An end plate assembly abuts the fuel cell at an end of said stack. The end plate assembly has an inlet area adapted to receive an exhaust gas from the stack, an outlet area and a passage connecting the inlet area and outlet area and adapted to carry the exhaust gas received at the inlet area from the inlet area to the outlet area. A further end plate assembly abuts the fuel cell at a further opposing end of the stack. The further end plate assembly has a further inlet area adapted to receive a further exhaust gas from the stack, a further outlet area and a further passage connecting the further inlet area and further outlet area and adapted to carry the further exhaust gas received at the further inlet area from the further inlet area to the further outlet area.

17 Claims, 20 Drawing Sheets

U.S. PATENT DOCUMENTS

| | | | |
|---|---|---|---|
| 6,844,100 B2 | 1/2005 | Bourgeois et al. | |
| 6,855,451 B2 * | 2/2005 | Ghosh et al. | 429/39 |
| 6,875,535 B2 | 4/2005 | Ye et al. | |
| 6,887,611 B2 * | 5/2005 | Cramer et al. | 429/38 |
| 7,070,874 B2 | 7/2006 | Blanchet et al. | |
| 7,226,681 B2 | 6/2007 | Florence et al. | |
| 2004/0086765 A1 | 5/2004 | Florence et al. | |

FOREIGN PATENT DOCUMENTS

| | | |
|---|---|---|
| JP | 01-048381 | 2/1989 |
| JP | 01-089154 | 4/1989 |
| JP | 04-121969 | 4/1992 |
| JP | 07-006782 | 1/1995 |
| JP | 09-293528 | 11/1997 |

* cited by examiner

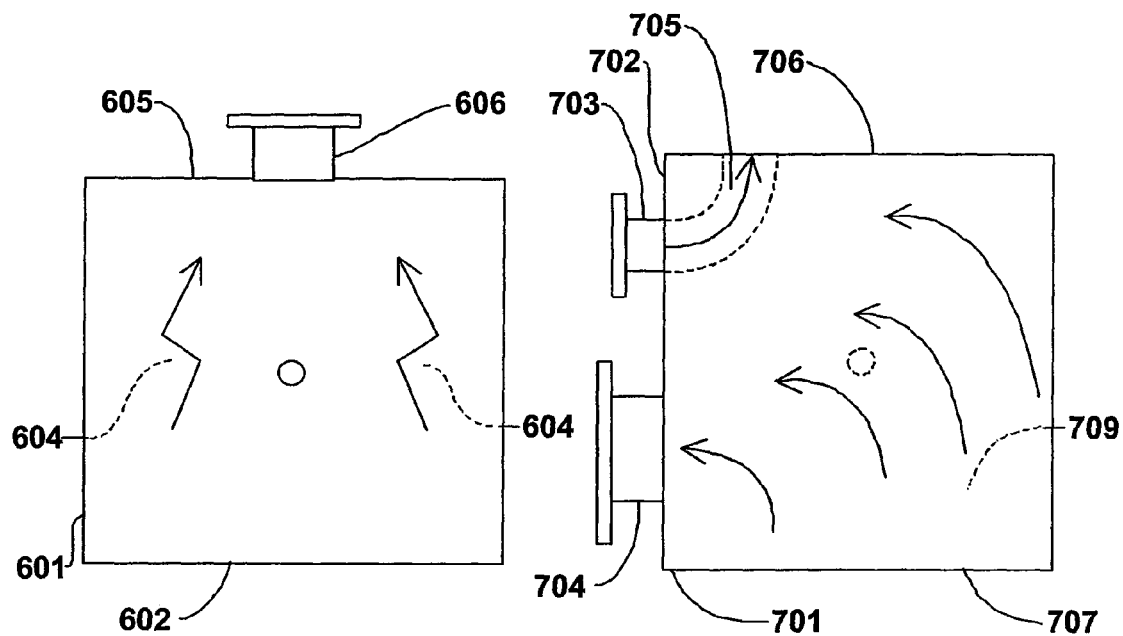
FIG. 15A
FIG. 15C
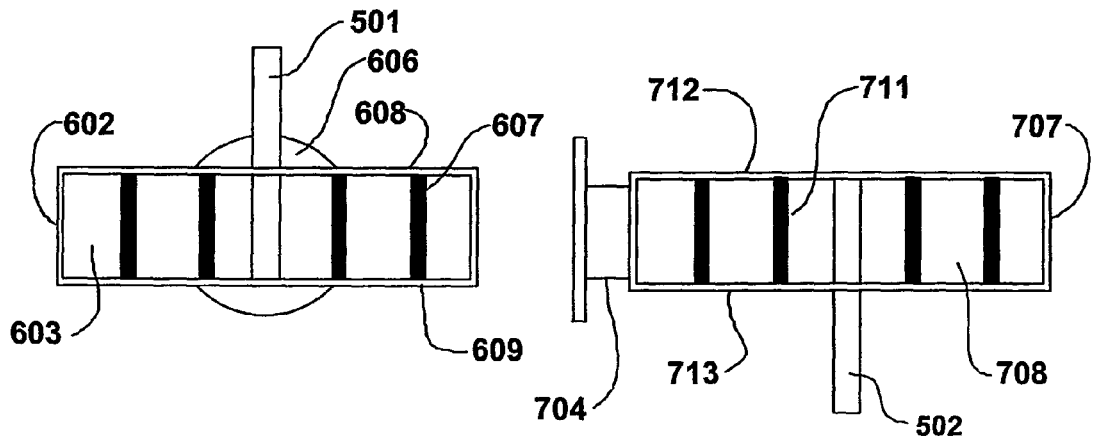
FIG. 15B
FIG. 15D

MODULAR FUEL-CELL STACK ASSEMBLY

CROSS-REFERENCE TO RELATED APPLICATIONS

This application is a divisional of application Ser. No. 10/916,235, filed Aug. 11, 2004 U.S. Pat. No. 7,323,270 issued on Jan. 29, 2008, the entire disclosure of which is hereby incorporated by reference.

STATEMENT AS TO RIGHTS TO INVENTIONS MADE UNDER FEDERALLY SPONSORED RESEARCH AND DEVELOPMENT

This invention was made with Government support under contract DE-FC21-95MC31184 awarded by the Department of Energy. The Government has certain rights in the invention.

BACKGROUND OF THE INVENTION

This invention relates to fuel cell systems and, more particularly, to multi-stack fuel cell systems.

In building fuel-cell systems, the fuel cells are conventionally stacked one on the other to form a fuel-cell stack. The number of cells determines the power rating of the stack and to provide systems with higher power ratings, a number of fuel-cell stacks are utilized and the outputs of the fuel cell stacks combined to provide the desired power output.

In one type of multi-stack fuel cell system, it has been proposed to modularize the system by forming modular multi-stack fuel cell assemblies each of which contains a plurality of fuel-cell stacks housed within an enclosure. In a system of this design developed for high temperature fuel cell stacks and, in particular, for carbonate fuel cell stacks, a rectangular or box-like containment structure is employed as the enclosure and the stacks are arranged in line along the length of the structure. Each of the stacks within the structure has inlet manifolds for receiving the fuel and oxidant gas needed to operate the stack and outlet manifolds for outputting exhaust fuel and oxidant gases from the stack.

The containment structure includes fuel and oxidant gas inlet ports for communicating through piping or conduits with the respective fuel and oxidant gas inlet manifolds of the stacks. The structure also has fuel and oxidant gas outlet ports for communicating through piping with the oxidant and fuel gas outlet manifolds. The fuel inlet ports are arranged in line along the length of the structure and a header delivers the fuel to each of the ports. A similar type of arrangement is used for the oxidant gas inlet ports. The fuel and oxidant gas outlet ports also communicate with respective headers for carrying the exhaust gases from the modular assembly.

In order to insure an appropriate uniform flow distribution and a desired pressure differential through the stacks, flow baffles are provided in the piping or conduits connecting the fuel and oxidant gas inlet ports to the respective stack inlet manifolds. Each of the stacks and the piping within the enclosure are also insulated to thermally isolate the stacks from the containment structure.

The cold box-like design of the container structure requires thermal expansion joints inside as well as outside of the containment structure to minimize the pressure differential across the fuel and oxidant seals. Nitrogen is also provided to purge any minute leaks from the fuel cell stacks into the enclosure.

While modular multi-stack fuel cell assemblies of the above type performed as desired, the piping and baffle requirements made each assembly complex and expensive. The thermal insulation requirements were also stringent, further adding to the cost of each assembly. Additionally, the need for a nitrogen gas purge added another gas stream increasing the process control requirements. These factors have lead designers to look for less complex and less costly design alternatives.

It is, therefore, an object of the present invention to provide a fuel cell assembly which can be used to improve a modular multi-stack fuel-cell assembly.

It is a further object of the present invention to provide a fuel cell assembly with end plate assemblies which can be used in a modular multi-stack fuel-cell assembly in which stack-to-stack flow distribution and differential pressure requirements are realized in a simpler and more cost effective manner.

It is yet another object of the present invention to provide a fuel cell assembly with end plate assemblies which can be used in a modular multi-stack fuel cell assembly in which input and output port requirements and piping requirements are significantly reduced.

SUMMARY OF THE INVENTION

In accordance with the embodiments of the invention to be disclosed hereinafter, a fuel cell assembly is provided in which a plurality of fuel cells are arranged in a stack. An end plate assembly abuts the fuel cell at an end of the stack. The end plate assembly has an inlet area adapted to receive an exhaust gas from the stack, an outlet area and a passage connecting the inlet area and outlet area and adapted to carry the exhaust gas received at the inlet area from the inlet area to the outlet area. A further end plate assembly abuts the fuel cell at a further opposing end of the stack. The further end plate assembly has a further inlet area adapted to receive a further exhaust gas from the stack, a further outlet area and a further passage connecting the further inlet area and further outlet area and adapted to carry the further exhaust gas received at the further inlet area from the further inlet area to the further outlet area.

In the embodiments disclosed, the exhaust gas is oxidant exhaust gas and the further exhaust gas is fuel exhaust gas and the further end plate assembly has another inlet area adapted to receive fuel, another outlet area and another passage connecting the another inlet area and another outlet area and adapted to carry fuel received at the another inlet area from the another inlet area to the another outlet area. Additionally, the stack has first and second opposing faces for receiving fuel gas and expelling exhausted fuel gas, respectively, and third and fourth opposing faces for receiving oxidant gas and expelling exhausted oxidant gas, respectively. First, second and third manifolds abut the first, second and fourth stack faces and the third manifold communicates with the inlet area of the end plate assembly, the first manifold communicates with the another outlet area of the further end plate assembly, and the second manifold communicates with further inlet area of the further end plate assembly.

Finally, also in the embodiments disclosed, the end plate assembly and the further end plate assembly each comprise a hollow body having upper and lower walls and a number of side walls connecting the upper and lower walls. The inlet area is in a first side wall of said hollow body of the end plate assembly and the outlet area is in a second side wall of the hollow body of the end plate assembly, and the passage of the end plate assembly is defined by the interior of said body of said end plate assembly. The further inlet area, in turn, is in a first side wall of the hollow body of the further end plate assembly and the further outlet area is in a second side wall of the hollow body of the further end plate assembly, and the passage of the further end plate assembly is defined by the interior of the body of the further end plate assembly. Additionally, the another inlet area is in the second side wall of the hollow body of the further end plate assembly and the another outlet area is in a third side wall opposing the first side wall of the hollow body of the further end plate assembly.

BRIEF DESCRIPTION OF THE DRAWINGS

The above and other features and aspects of the present invention will become more apparent upon reading the following detailed description in conjunction with the accompanying drawings, in which:

FIGS. 13, 14 and 15A-15D show the a stack of the fuel cell assembly of FIG. 1 depicting the details of the hollow, flow through end plates of the stack.

DETAILED DESCRIPTION

Figure 1:
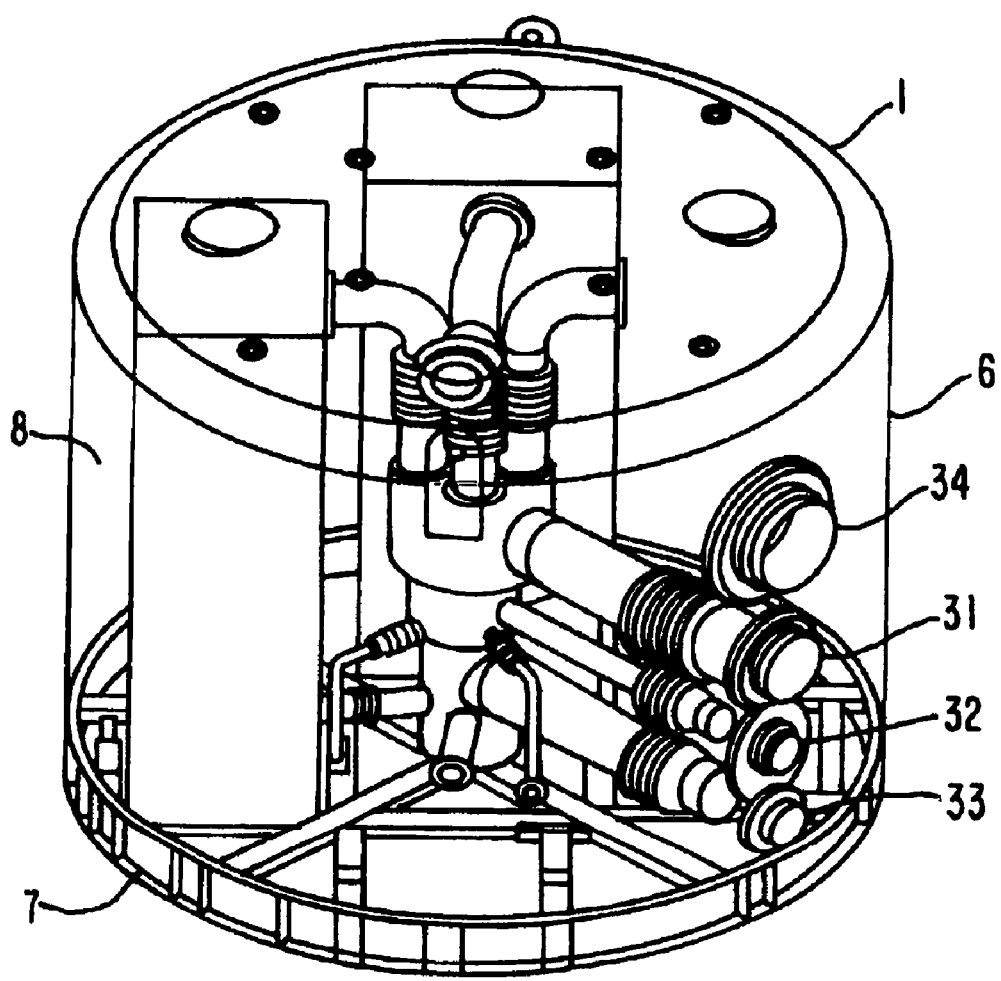
FIG. 1 shows a modular multi-stack fuel cell assembly and gas flow distributor in accordance with the principles of the present invention with the upper enclosure of the containment structure in place.

FIGS. 1-11 show various views of a modular multi-stack fuel cell assembly 1 in accordance with the principles of the present invention. The assembly 1 includes a plurality of like fuel cell stacks, shown as opposing stacks 2 and 3 and opposing stacks 4 and 5. To permit viewing of the other components of the assembly 1, the stacks 2 and 5 are not depicted in FIG. 2, but can be seen FIG. 3 and FIGS. 8-10.

The stacks 2-5 each extend height-wise in the vertical direction and are supported on a base section 7 of a containment structure 6. The containment structure also includes an upper enclosure 8 (shown in FIG. 1) which surrounds and encloses the fuel cell stacks. Centrally situated relative to the stacks in the enclosure 8 is a gas flow distributor 9 which serves as the unit for the distribution of fuel and oxidant to and from the fuel cell stacks.

Figure 2:
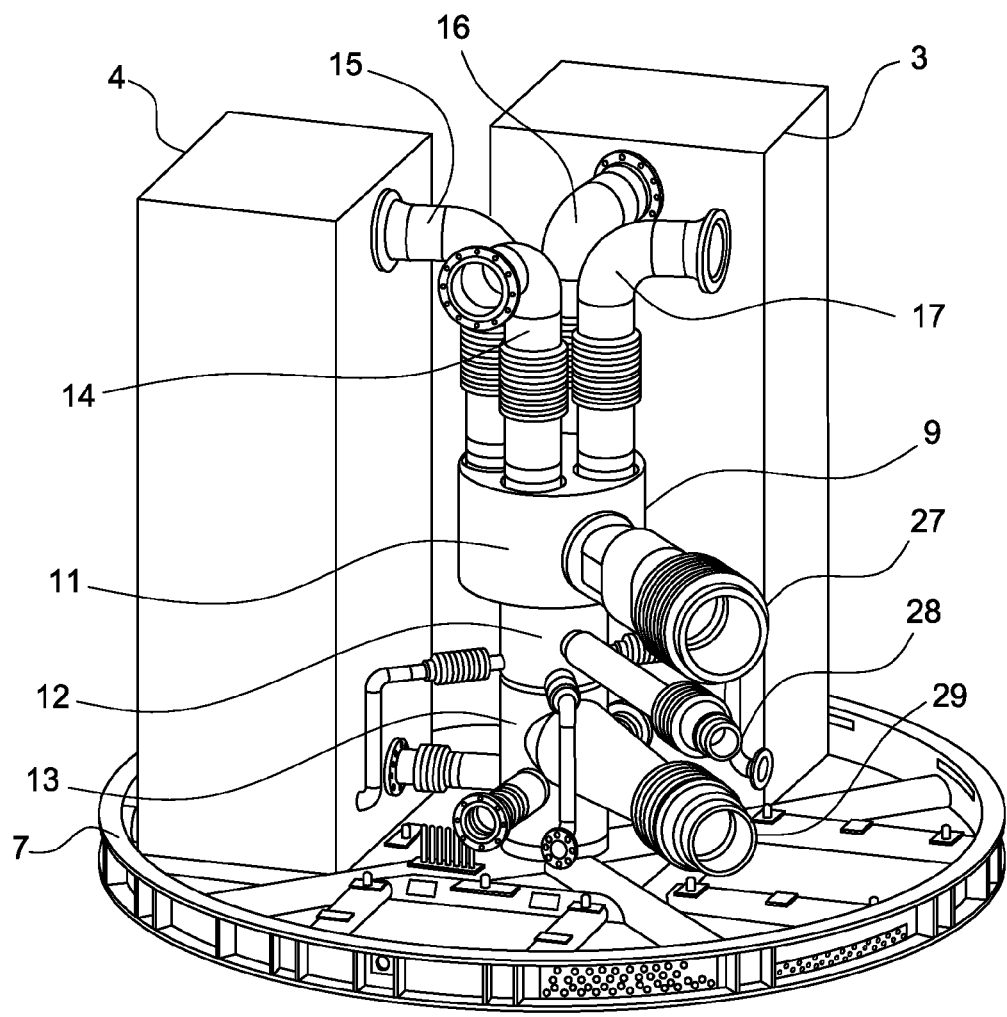
FIG. 2 shows the modular multi-stack fuel cell assembly of FIG. 1 with the upper containment structure removed.
Figure 3:
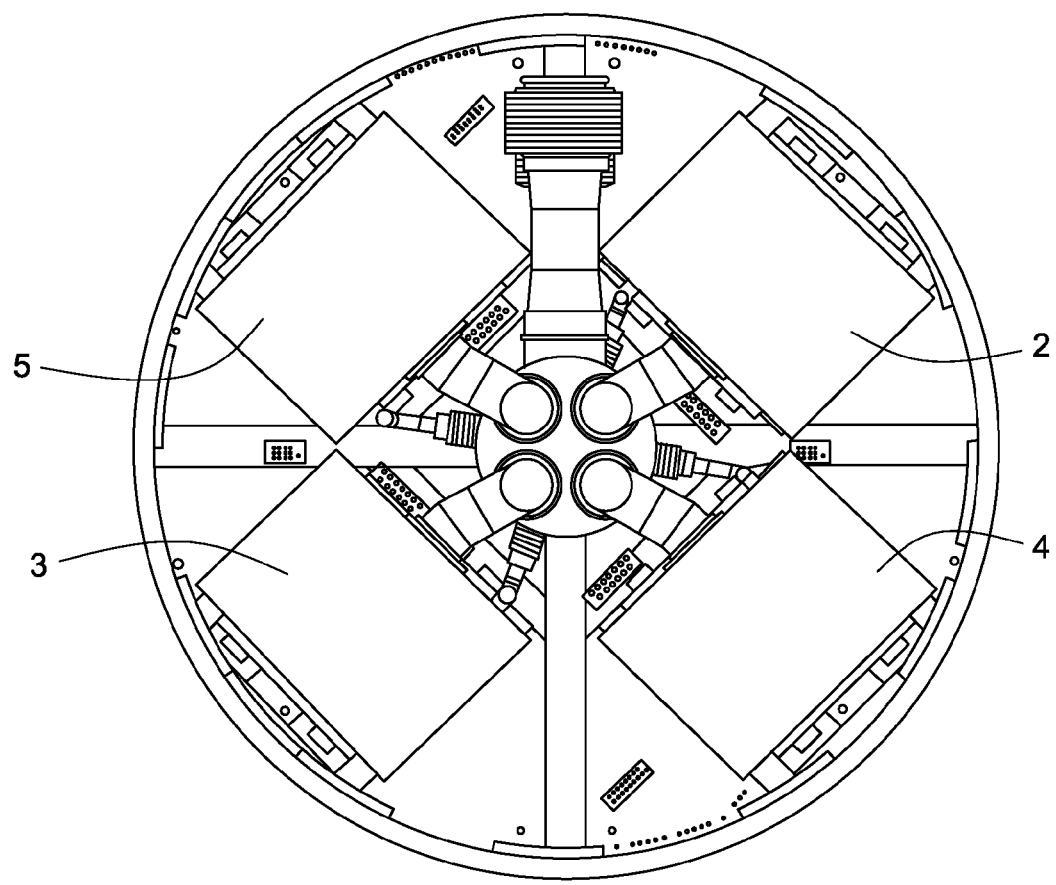
FIG. 3 shows a top view of the assembly of FIG. 1 with the upper enclosure of the containment vessel removed.
Figure 8:
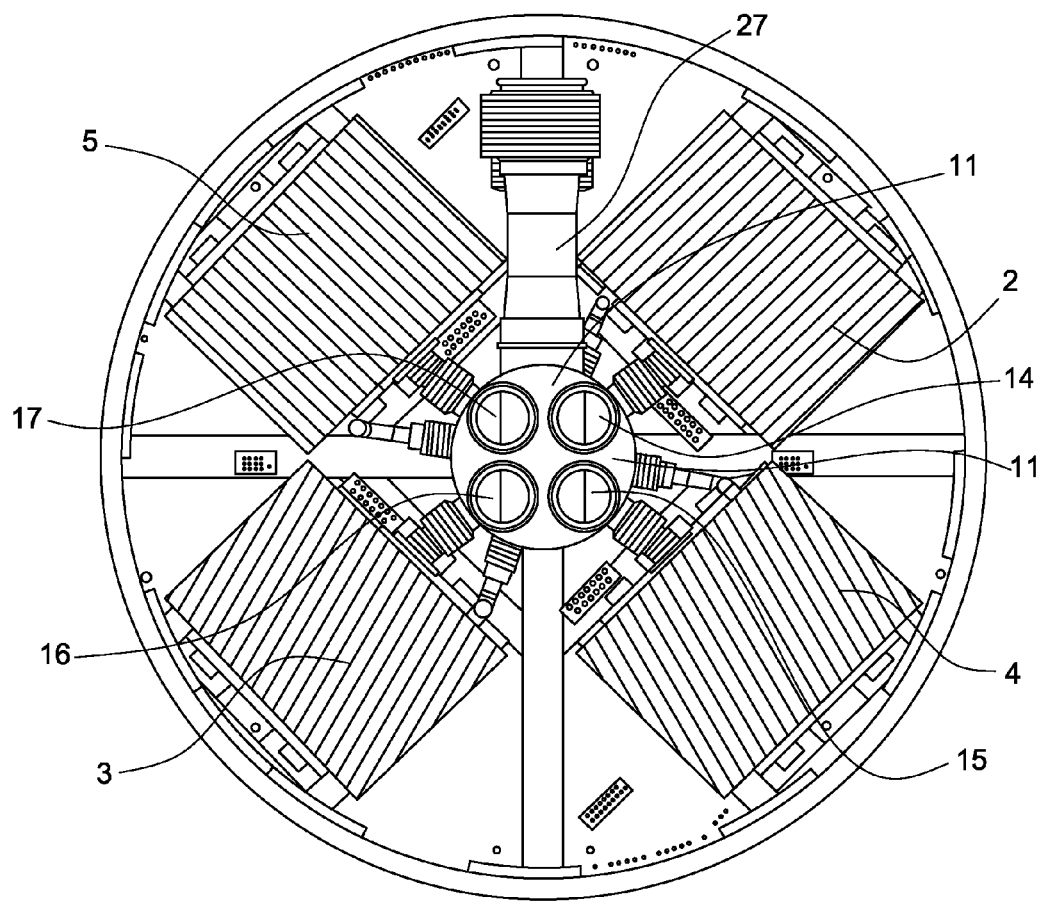
FIGS. 8-10 show various plane views of the fuel cell assembly and gas flow distributor of FIG. 1.
Figure 9:
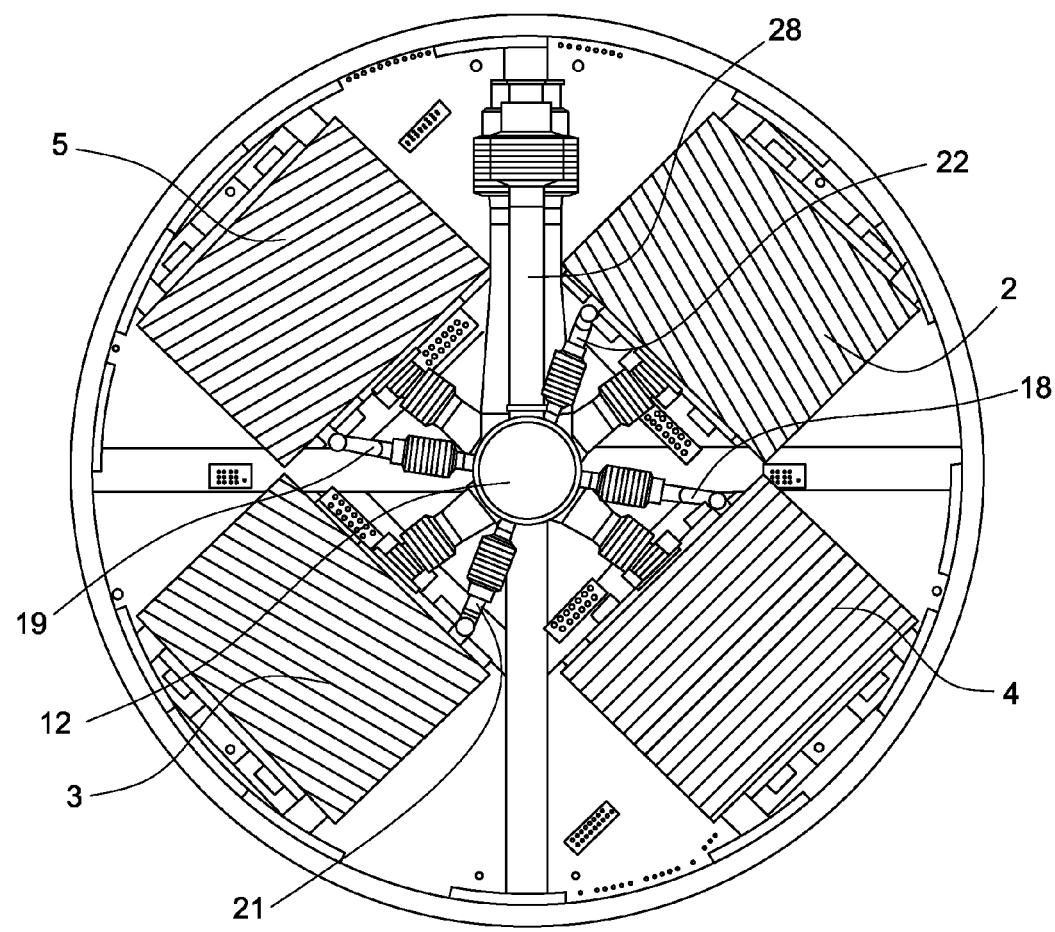
Figure 10:
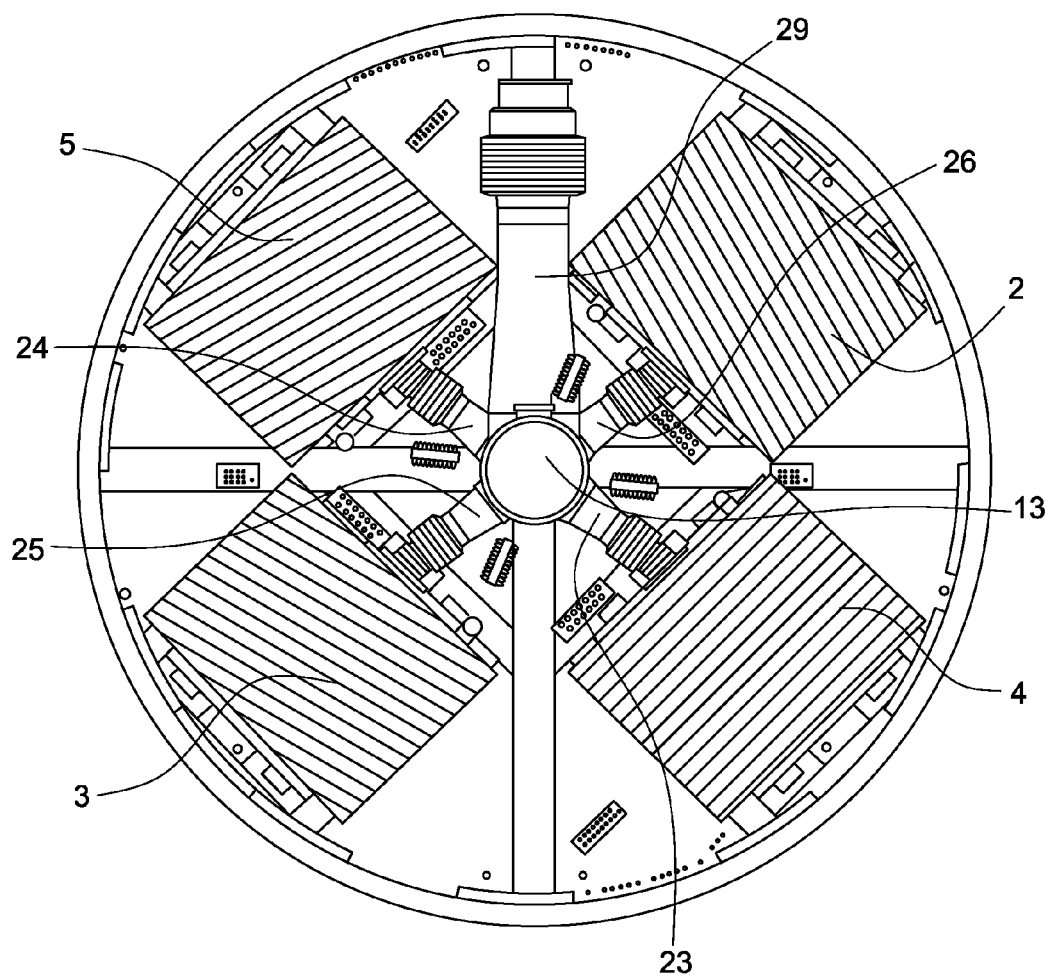

More particularly, referring to FIG. 2, the distributor 9 includes an oxidant exhaust gas section 11, a fuel inlet section 12, and a fuel exhaust gas section 13, all aligned in the vertical direction. Additionally, the distributor 9 includes piping or conduits for coupling the respective fuel or oxidant constituents to and from the distributor sections. Specifically, as shown in FIGS. 2 and 8, conduits 14, 15, 16 and 17, couple exhaust oxidant gases from the respective stacks 2, 4, 3 and 5 to the oxidant exhaust gas section 11. Conduits 18, 19, 21 and 22, in turn, couple fuel from the fuel inlet section 12 to the stacks 4, 5, 3 and 2, respectively, as shown in FIG. 9, and conduits 23, 24, 25 and 26 couple exhaust fuel gases from the stacks 4, 5, 3 and 2, respectively, to the fuel exhaust section 13, as shown in FIG. 10.

Figure 7:
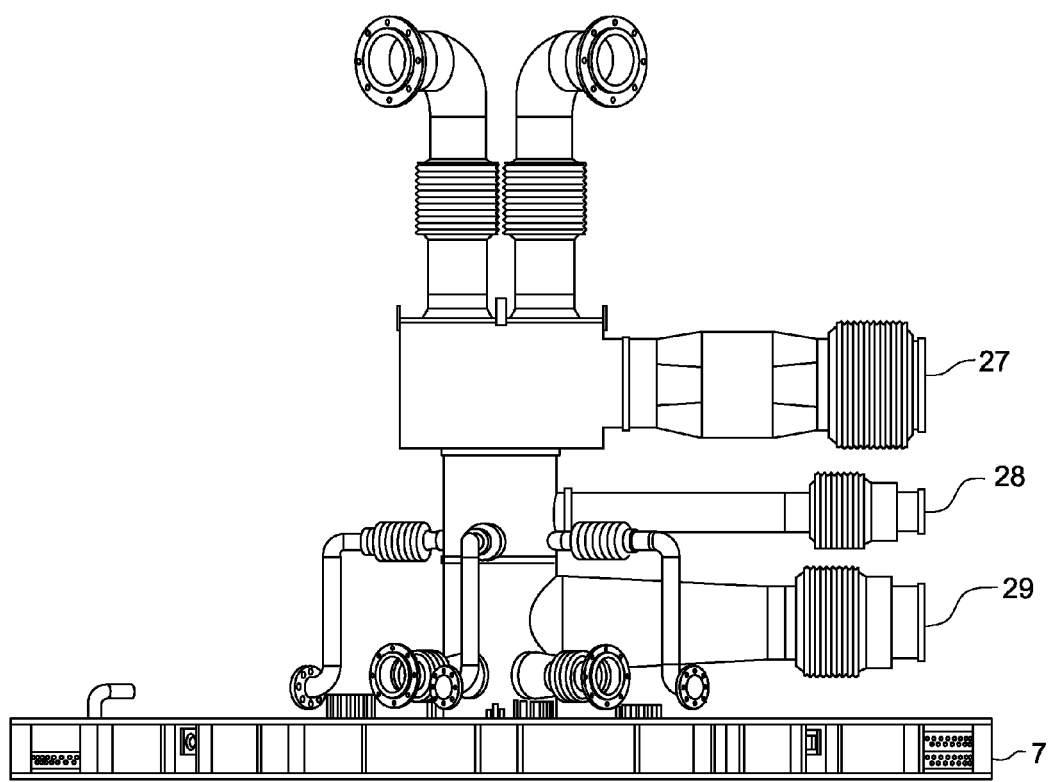
FIG. 7 shows an elevation view of the gas flow distributor of FIG. 1.

The distributor also includes further conduits 27, 28 and 29, as shown in FIGS. 2 and 7. Referring to the latter two figures and FIG. 1, the conduit 27, which carries oxidant exhaust gases from the section 11, connects to an oxidant gas exhaust port 31 in the upper enclosure 8. The conduit 28, which receives fuel from a fuel inlet port 32 in the upper enclosure 8, connects to the section 12. The conduit 29, in turn, which carries fuel exhaust gas from the section 13, connects to the fuel gas exhaust port 33 in the upper enclosure.

In the case shown, each of the fuel cells stacks 2-5 is a high temperature fuel cell stack, as, for example, a molten carbonate fuel cell stack.

In accord with the invention, the distributor 9, including the sections 11-13 and the conduits 18, 19 and 21-29, is adapted to itself promote desired uniform gas flow and desired uniform pressure differential through the stacks 2-5. In the case shown, this is accomplished by disposition of the distributor 9 symmetrically and centrally of the stacks.

Specifically, the fuel inlet conduit 28 and fuel distribution section 12 are used in common for all the stacks, and equal length conduits 18, 19, 21 and 22, are used for carrying fuel from the distribution section 12 to the respective stacks. Similarly, equal length conduits 14-17 couple exhaust oxidant gas from the stacks to a common oxidant exhaust distribution section 11 from which the gas exits through a common conduit 27. Likewise, equal length conduits 23-26 carry the fuel exhaust gas from the stacks to the common fuel exhaust distribution section 13 from which this gas exits through the common conduit 29.

Figure 11:
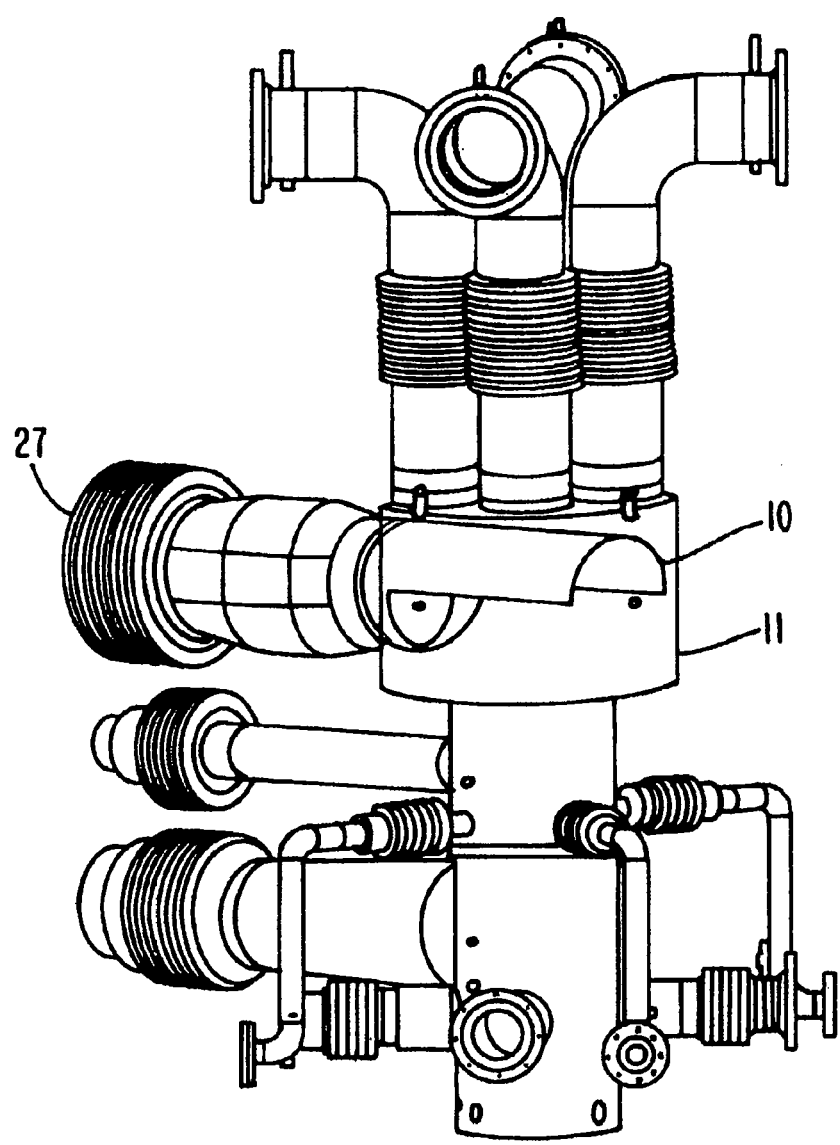
FIG. 11 illustrates an isometric view of the gas flow distributor with the exhaust oxidant gas internal baffle being shown.

In order to assure uniform oxidant gas flow and pressure drop to the fuel cell stacks 2-5, the exhaust distributor section 11 is fitted internally with a continuing section 10 of the conduit 27, as shown in FIG. 11. As shown, the continuing section is a part cylindrical shape, and in particular, a one half cylinder.

Thus, with this configuration for the distributor 9, both the flow distribution of the fuel and the flow distribution of the oxidant is made more uniform. The pressure differential of the gases through the stacks is also made more uniform. The need for additional components to provide this uniformity is, therefore, significantly reduced through the use of the distributor 9. The overall energy losses associated with the flow distribution are also minimized.

Figure 12:
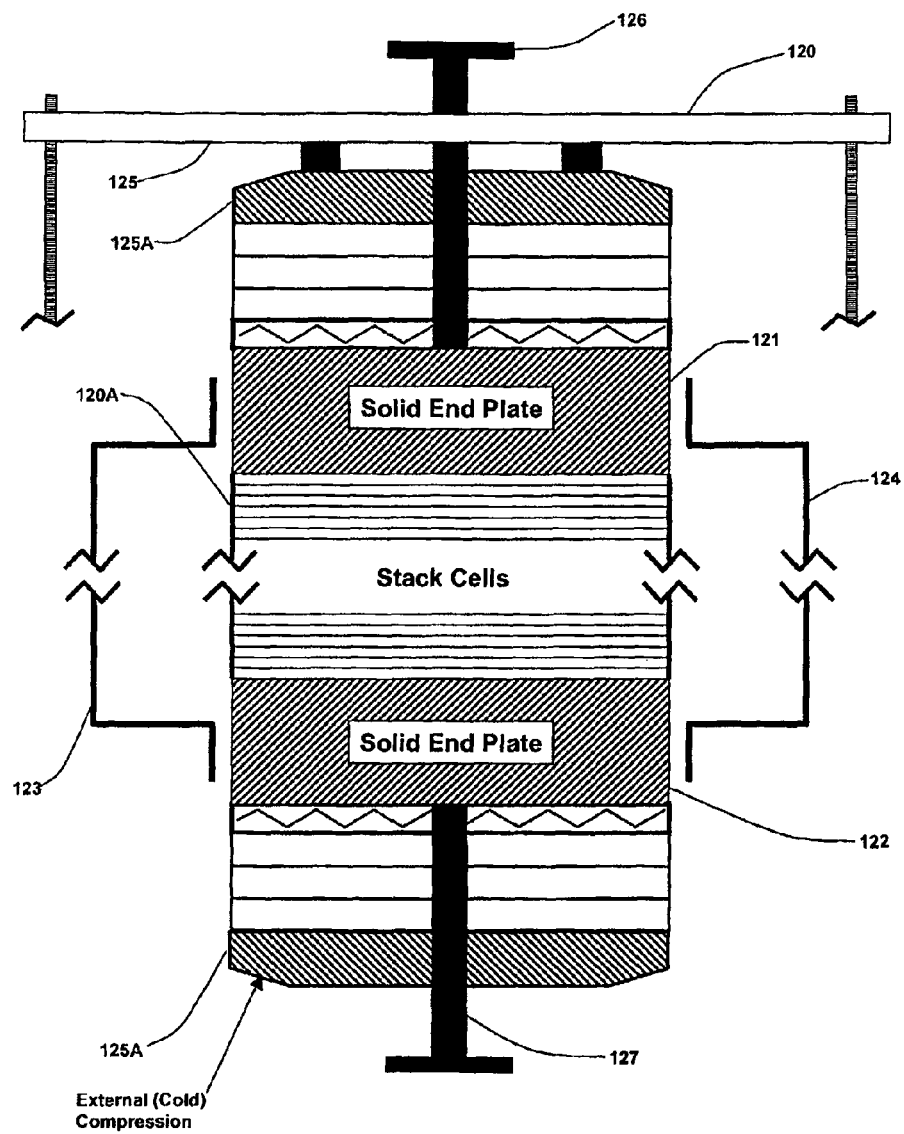
FIG. 12 shows a conventional fuel cell stack assembly with solid end plates.

Also contributing to the uniformity in the flow distribution of the oxidant and fuel is the end plate assemblies of the fuel cell stacks 2-5. These end plate assemblies incorporate a hollow flow through design which differs form the solid end plate design of convention fuel cell stacks. More particularly, FIG. 12 shows a conventional fuel cell stack 120 with solid upper and lower end plates 121 and 122. A manifold 123 couples supply gas to the fuel cells 120A of the stack 120 and a manifold 124 couples exhaust gas from the fuel cells. A compression assembly 125 having upper and lower compression plates 125A maintains the cells of the stack in place. Upper and lower terminals 126 and 127 extending through the compression plates and connecting to the end plates permit coupling of electrical energy from the stack.

The conventional stack 120 of FIG. 12 is not able to provide uniform flow due to the asymmetric manifold connections which result, in part, from the solid end plates. The stack 120 also requires additional electric heaters due to these end plates.

In contrast, each of the fuel cell stacks 2-5 of the invention includes upper and lower end plate assemblies 601 and 701. FIGS. 13, 14 and 15A-15D show these assemblies for the stack 2. The stacks 3-5, which are of the same configuration as the stack 2, have like end plate assemblies. As will be discussed below, the end plate assemblies 601 and 701 allow fuel to be readily coupled to the stacks by the equal length conduits 18, 19, 21 and 22, and further permit exhausted oxidant gas and exhausted fuel gas to be likewise readily coupled from the stacks via the equal length conduits 14-17 and equal length conduits 23-26, respectively.

Figure 13:
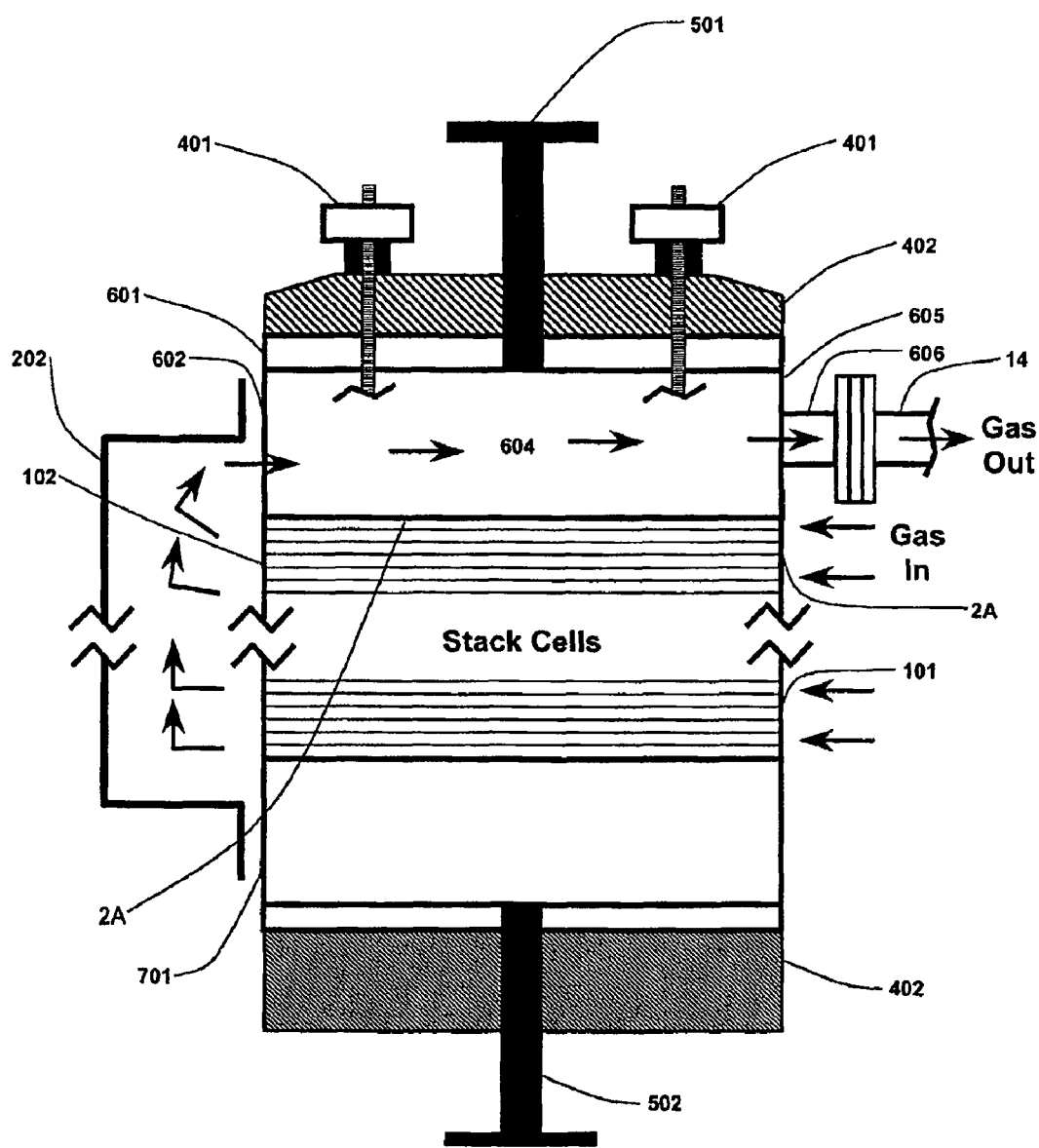
Figure 14:
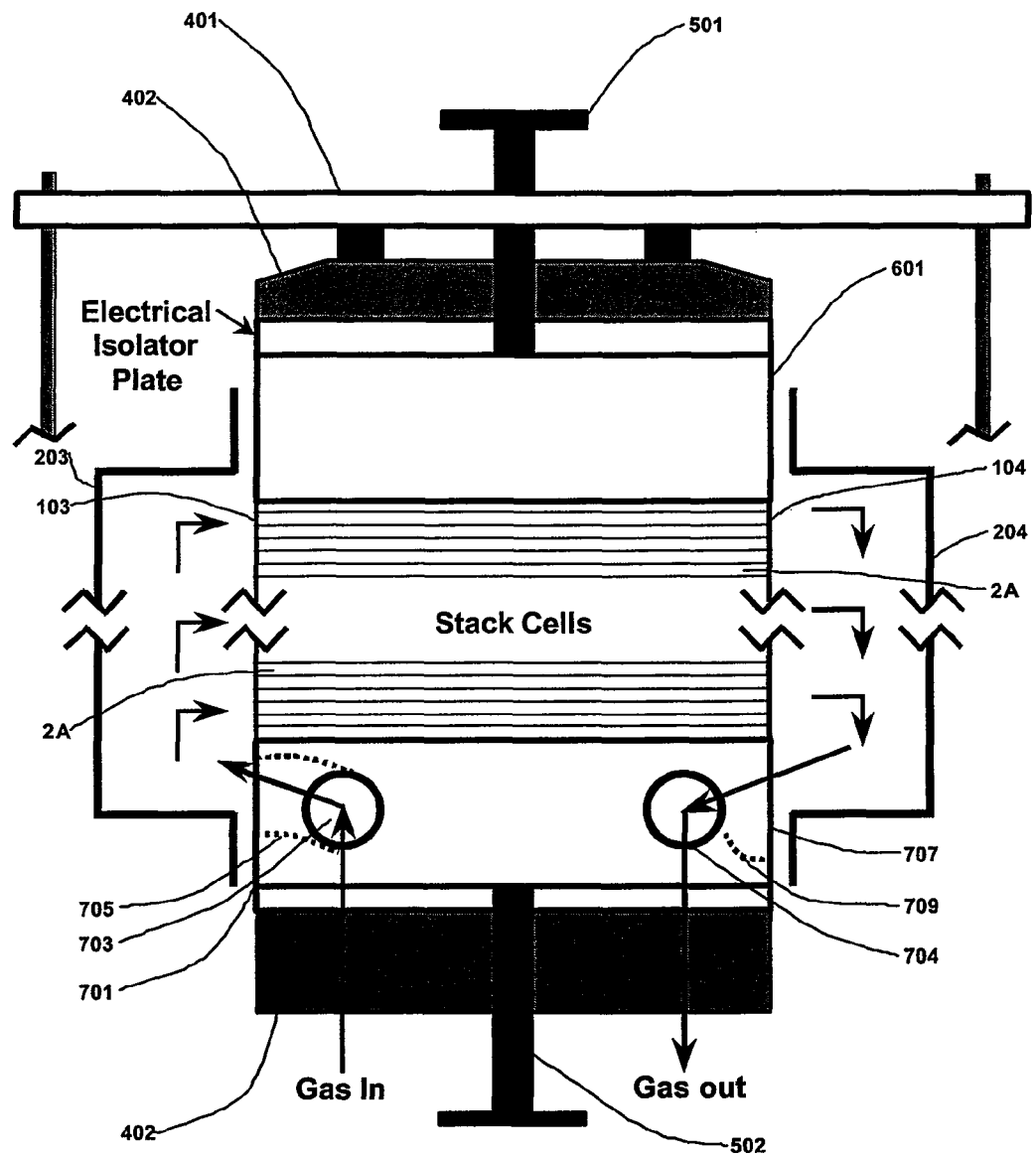

Referring to FIGS. 13 and 14, the stack 2 has opposing first and second faces 101 and 102 associated with oxidant gas flow and opposing third and fourth faces 103 and 104 associated with fuel gas flow. The stack 2 further has first, second and third manifolds 202, 203 and 204 which abut the stack faces 102, 103, and 104, respectively. Retention assemblies (not shown) maintain these manifolds against the stack faces and a compression assembly 401 having compression plates 402 compress the upper and lower end plates 601 and 701 to maintain the cells 2A of the stack in place. Upper and lower terminals 501 and 502 extending through the compression plates 402 permit obtaining electrical output from the stack.

FIGS. 15A-15B show further details of the upper end plate assembly 601. As shown, the end plate assembly 601 has inlet areas 603 on a face 602 of the assembly. This face of the assembly is overlapped by and receives exhausted oxidant gas from the respective oxidant exhaust gas outlet manifold 202 of the respective stack. The end plate assembly 601 further includes or defines a passage 604 which extends through the assembly to an outlet area 606. The outlet area 606 is disposed on another face 605 of the assembly, the latter face, in the case shown, opposing the face 602 of the assembly. The outlet area 606, in turn, couples with the conduit 14 of the distributor 9 carrying oxidant gas from the respective stack. The edges of the end face 602 of the assembly 601 form seal areas which accommodate the seals of the manifold 202. If desired, these seal areas can be extended using a recessed geometry to further accommodate the dimensional changes occurring during long term operation.

Also, in the case shown, posts 607 are distributed in the interior of the end plate assembly 601 and extend between upper and lower faces 608 and 609 of the assembly. The posts 607 provide mechanical strength to the end plate assembly and electrical contact between the faces 608 and 609. The end plate assembly thus provides electrical contact between the stack terminal 501, affixed to the face 608 of the assembly, and the cells of the stack which are in electrical contact with the face 609 of the assembly.

In the form of the end plate assembly 601 shown in FIGS. 13 and 15A-15B, the assembly is configured as a hollow body, shown as a hollow rectangular body. The faces 602 and 605 are, in turn, defined by opposing side walls of the body, the passage 604 by the interior space of the body, and the faces 608 and 609 by the opposing upper and lower walls of the body.

The overall thermal mass of the end plate assembly 601 is reduced due to the hollow configuration. The flow through geometry of the assembly allows the process gases to provide heat for the assembly, and thus eliminates the need for a separate electric heater and associated parasitic power. The resultant end plate assembly is much closer in thermal response to the rest of the fuel cell stack. The overall weight and cost are reduced, while the net electrical output available from the fuel cell stack is increased.

Lower end plate assembly 701 is shown in detail in FIGS. 14 and 15C-15D. As shown, this end plate assembly has a first face 702 which includes an inlet area 703 adapted to be coupled to the conduit of the distributor 9 delivering fuel to the respective stack. This face also includes an outlet area 704 which is adapted to be coupled to the conduit of the distributor 9 carrying exhausted fuel gas from the stack. The end plate assembly 701 further defines a first passage 705 which couples with the inlet area 703 and carries fuel delivered to the inlet area to a second face 706. This face of the end plate assembly is overlapped by the fuel inlet manifold of the respective stack. A third face 707 of the plate assembly having inlet area 708 is overlapped by the fuel exhaust gas outlet manifold of the stack. The end plate assembly 701 additionally defines a further passage 709 which couples the inlet area 708 to the outlet area 704.

The end plate assembly 701 also includes in its interior posts 711 connected between the opposing faces 712 and 713 of the plate assembly. These posts, like the posts 607 of the end plate assembly 601, provide mechanical strength to the assembly and electrical contact between the faces 712 and 713. This contact, in turn, provides electrical contact to the stack terminal 502 affixed to the face 713.

In the case shown in FIGS. 15C-15D, the end plate assembly 701 is also in the form of a hollow body and, in particular, a rectangular hollow body. The face 702 is defined by a first side wall of the hollow body, the faces 706 and 707 by opposing second and third side walls of the body, the passage 705, by a tube extending through the interior of the body, the passage 709 by the interior of the body, and the surfaces 712 and 713 by the opposing upper and lower walls of the body.

As can be appreciated and as discussed hereinabove, with the end plate assemblies 601 and 701 of each stack configured in the above manner, oxidant and fuel are coupled to and from the stacks exclusively through the end plate assemblies. The flow connection can be from the side faces, top or bottom faces. The flow of oxidant and fuel through the stack 2 will be described with reference to FIGS. 13 and 14. The flow through the other stacks is similar.

Specifically, oxidant gas entering the upper enclosure 8 through the oxidant gas inlet port 34 is conveyed by the upper enclosure acting as an oxidant gas inlet manifold to the face 101 of the stack 2. This face has inlets for the oxidant flow channels of the fuel cells 2A of the stack. The oxidant then flows through these channels of the fuel cells and oxidant exhaust gas exits these channels at the opposing face 102 of the stack 2. The manifold 202 abutting this stack face then carries the oxidant exhaust gas to the face 602 having the inlet areas 603 of the end plate assembly 601. The oxidant exhaust gas is then conveyed by the passage 604 through the assembly to the outlet area 606. This area is coupled to the conduit 14 of the distributor 9 (see, FIG. 8) which conduit carries the gas to the oxidant exhaust gas section 11 of the distributor. The oxidant exhaust gas then leaves the section 11 via the conduit 27 and exits the upper enclosure though the outlet port 31.

The fuel, on the other hand, enters the upper enclosure via the fuel inlet port 32 and is coupled to the distributor section 12 via the conduit 28 (see, FIG. 9). The distributor section 12 passes the fuel to the conduit 22 which is coupled to the inlet area 703 of the lower end plate assembly 701 (see, FIG. 14). The fuel passes from the inlet area through the passage 705 which deposits the fuel in the fuel gas inlet manifold 203. The fuel then passes through the fuel cells 2A of the stack 2 and fuel exhaust gas enters the fuel gas outlet manifold 204. This manifold couples the fuel exhaust gas to the face 707 having the inlet area 708 of the plate assembly 701. The fuel exhaust gas passes from the inlet area 708 through the passage 709 of the plate assembly arriving at the outlet area 704.

The gas exits the outlet area 704 into the conduit 26 of the distributor 9 (see, FIG. 10) and is carried to the fuel exhaust gas section 13 of the distributor. The exhaust gas leaves this section through the conduit 29 and exits the enclosure through the exhaust gas outlet port 33.

As can be appreciated, with the end plate assemblies 601 and 701, the gas flow connections to the stacks 2-5 are made only at the end plates assemblies and no connections are made at the manifolds. This arrangement mechanically decouples the manifolds from the stack leading to a better mechanical design for long term operation. Also, the mechanical connections to the stronger end plates are more robust than those conventionally made to the thin-walled stack manifolds.

Figure 4:
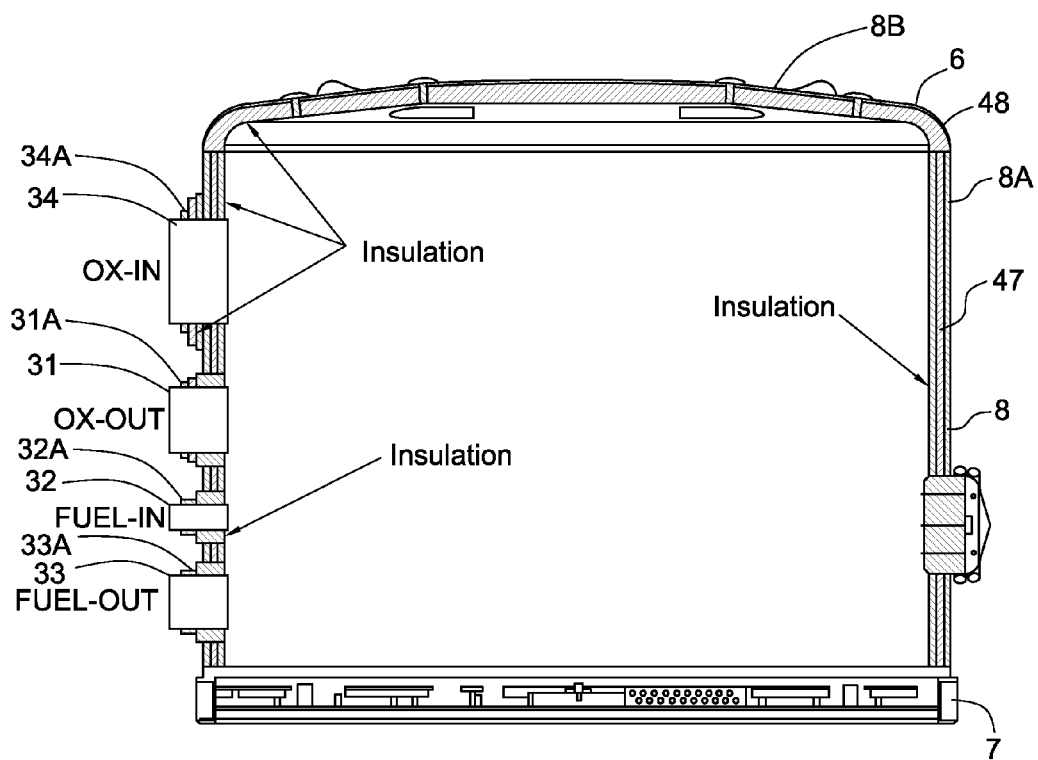
FIG. 4 shows a cross-section view of the containment structure of the assembly of FIG. 1.
Figure 6:
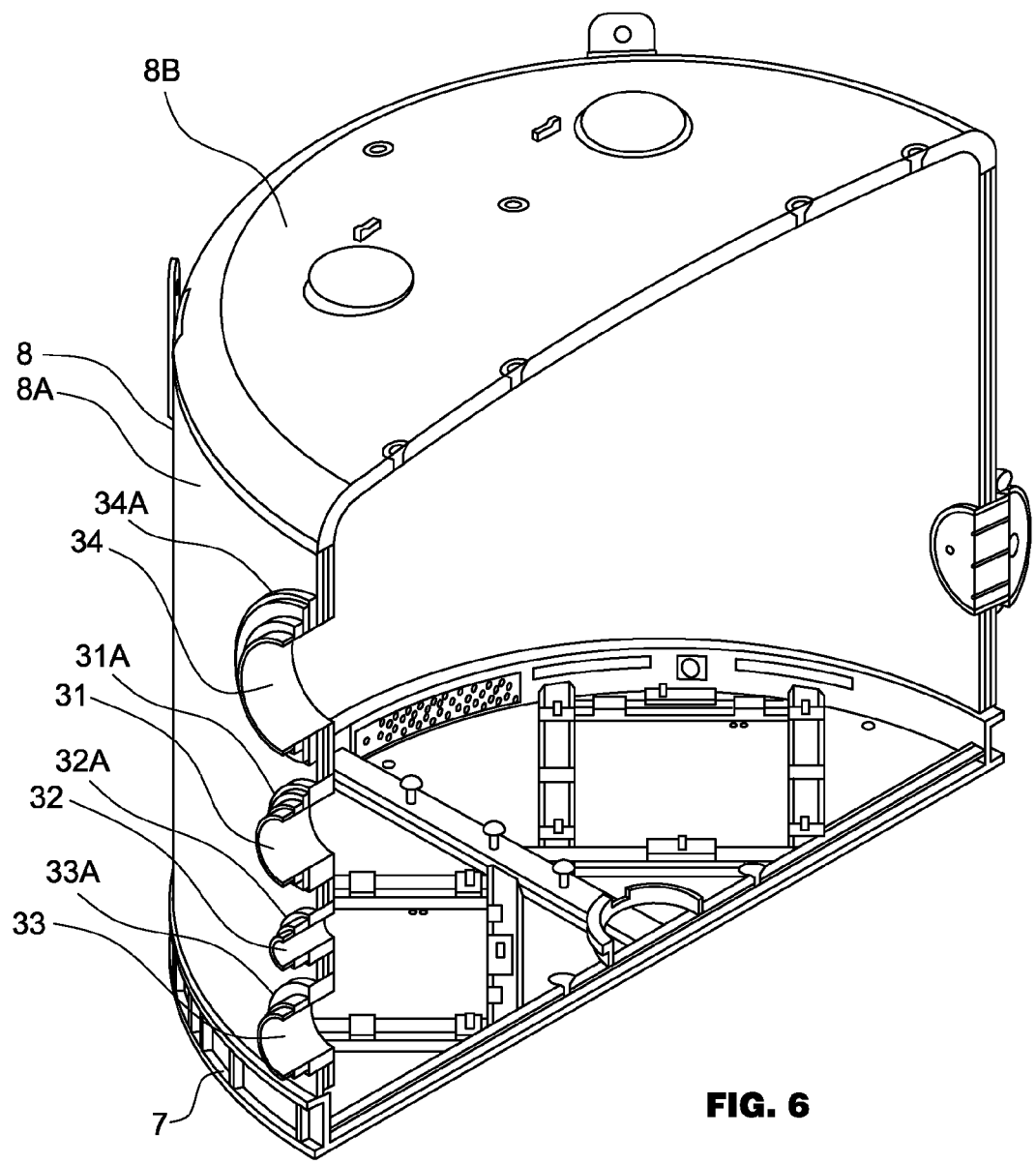
FIG. 6 shows an isometric cross-section of the containment structure of the assembly of FIG. 1.

FIGS. 4 and 6 show elevation and cross-sectional views, respectively, of the containment structure 6 of the modular multi-stack fuel cell assembly of FIG. 1. As above-indicated, the containment structure 6 includes a base section 7 which supports an upper enclosure 8.

In the case shown, the upper enclosure 8 has a cylindrical shell or vessel body 8A and a torispherical cover or top 8B. This permits the use of a thin structure for the cover 8B, while still being able to accommodate the pressurized environment of the upper enclosure. Alternately, the cover 8B may be formed to have a flat configuration to accommodate a greater height of the stack and to realize a more compact layout.

Situated along a common vertical line on the vessel body 8A are the oxidant gas inlet port 34, the oxidant exhaust gas outlet port 31, the fuel inlet port 32 and the fuel exhaust gas outlet port 33. As can be seen in the views of FIGS. 4 and 6, the ports 31-34 are each in the form of a nozzle with stepped transitions. Thus the port 34 has step transitions 34A, the port 31, stepped transitions 31A, and the ports 32 and 33, stepped transitions 32A and 33A. These transitions allow the respective nozzles to accommodate expansion of the vessel body 8A, while still maintaining an effective connection to the piping connected to the nozzles. This avoids the need to use bellows or other types of expansion joints to maintain these connections, thereby conserving space and lessening costs. The stepped transitions also help in thermally insulating the nozzles as discussed below.

More particularly, the volume of the regions defined by the stepped transitions can be filled with layers of cylindrical thermal insulation, as indicated in FIG. 4. This is seen in greater detail in FIG. 19 which shows in enlarged scale the nozzle 34 with the stepped transitions 34A. As can be seen, cylindrical insulation layers 901, 902 and 903 fill the volume of the regions defined by the stepped transitions 34A. The piping which is coupled through the nozzle can thus be thermally insulated from the surfaces of the vessel body 8A so as to maintain the outer surface of the vessel body at a much lower temperature than the interior space defined by the upper enclosure.

Figure 5:
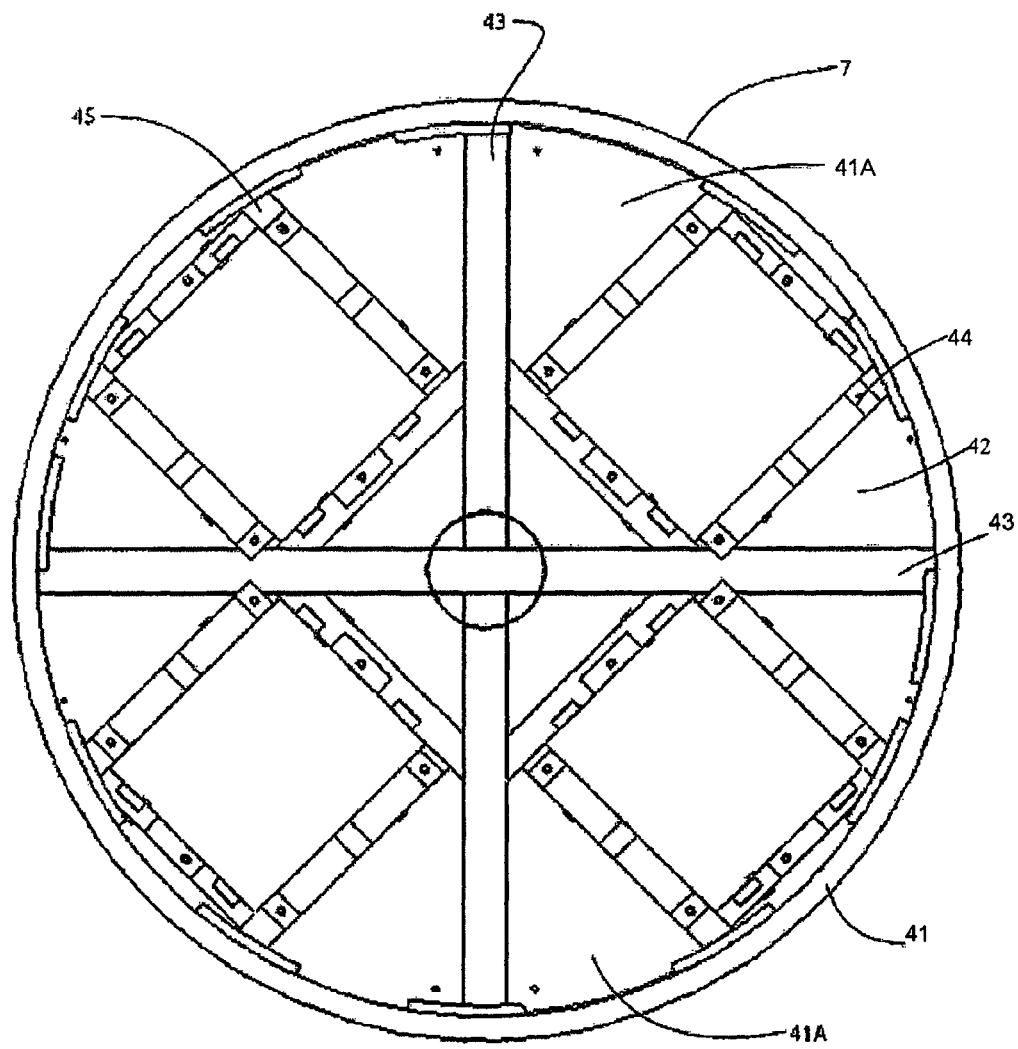
FIG. 5 shows a top view of the lower support base members for the containment structure of fuel cell assembly FIG. 1.

As seen in detail in FIG. 5, the bottom section 7 of the containment structure 6 comprises a vessel support ring 41 and a structural base 42. The ring 41 is made from structural steel to which the vessel body 8A and the structural base 42 are attached, respectively. The structural base 42 comprises stack support beams 43 and 44. The beams are arranged in a grill pattern, with groups of four beams 44 forming a rectangular support frame 45 for each of the stacks 2-5. The beams 43, in turn, are arranged to cross each other and to support the gas distributor 9 at their area of intersection. The beams 43 also intersect the inner corners of the rectangular support frames. The beams 43 are adapted to be mounted to the floor of the facility in which the assembly 1 is to be used and provide the major structural support for the assembly.

Figure 16:
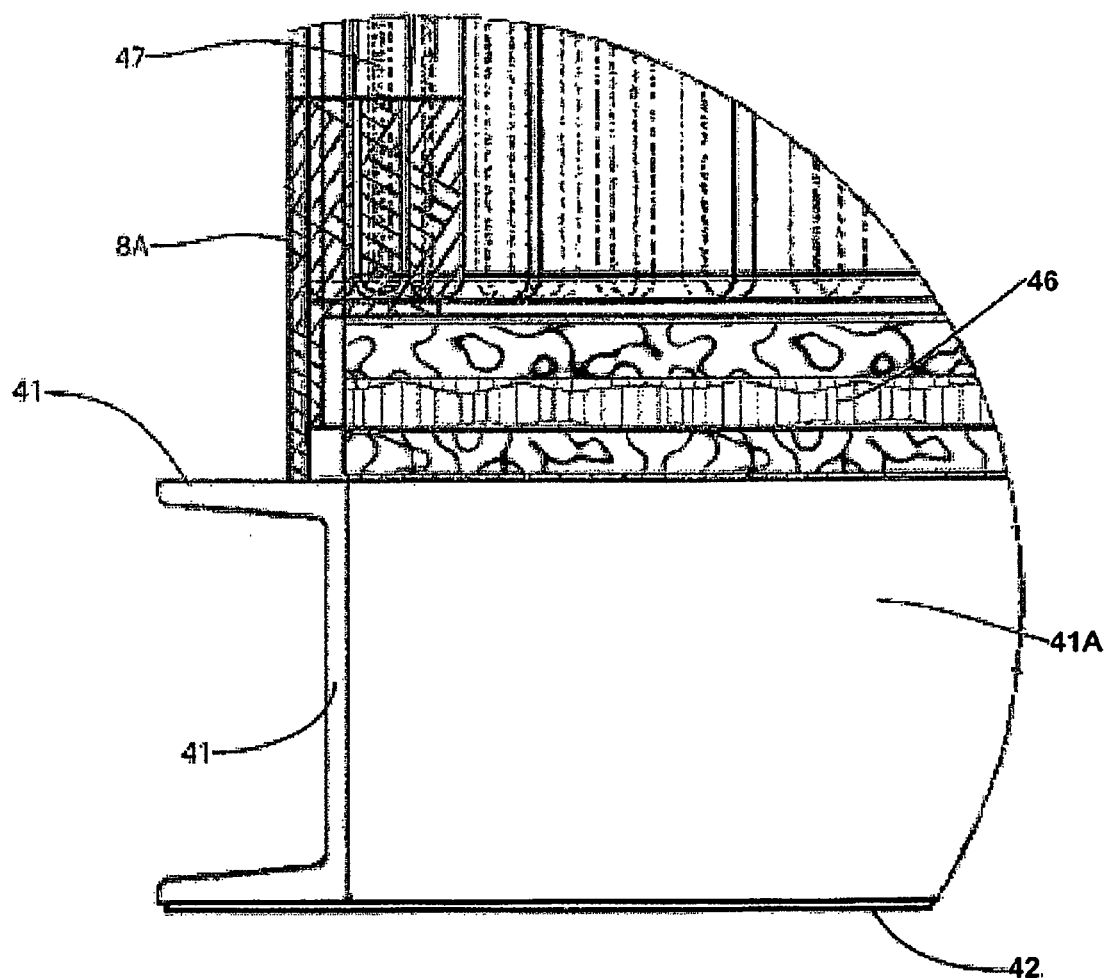
FIGS. 16-19 show the details of the thermal insulation used in the containment structure of the fuel cell assembly of FIG. 1.

Referring to FIG. 16, in order to thermally insulate the area 41A within the ring 41 below the vessel body 8A from the heat generated within the vessel body 8 by the stacks 2-5, the bottom section 7 further includes a thermally insulated floor 46 (see FIG. 16) which covers the opening and is also supported by the ring 41. The floor has openings for passage of lower ends of the stacks 2-5 therethrough so that the compression plate of each stack can rest on the beams 44 of the corresponding support frame 45. The space below the thermal insulation 46 can thus be used to house components of the compression assemblies of the stacks. Additionally, all electrical components to be used with the stacks can be housed in this thermally insulated area as well as all other penetrations into the assembly 1, such as, for example, electrical penetrations. The floor 46 also has drains for passage of collected water from internal condensation.

In addition to insulating the area 41A of the bottom section 7 from the heat within the upper enclosure 8, the vessel body 8A and the top cover 8B are each thermally insulated so that the outer surface of the upper enclosure is also thermally insulated from the heat within the enclosure. More particularly, the inner walls of the vessel body and top cover are provided with like thermal insulation assemblies 47 and 48 as shown in FIGS. 4, 17, 17A, 18 and 19.

As can be seen, the assemblies 47 and 48 each comprise a condensation accumulation layer 49 formed of fine mesh stainless steel. This layer abuts the inner wall of the enclosure and accumulates any moisture on the wall, allowing the moisture to condense and drip down to be purged from the interior of the enclosure. A next layer 50 of hydrophobic material such as micro-porous silica follows layer 49. Thermal insulation layers 51 then follow the layer 50 and a stainless steel lining 52 follows the insulation layers 51.

Figure 17:
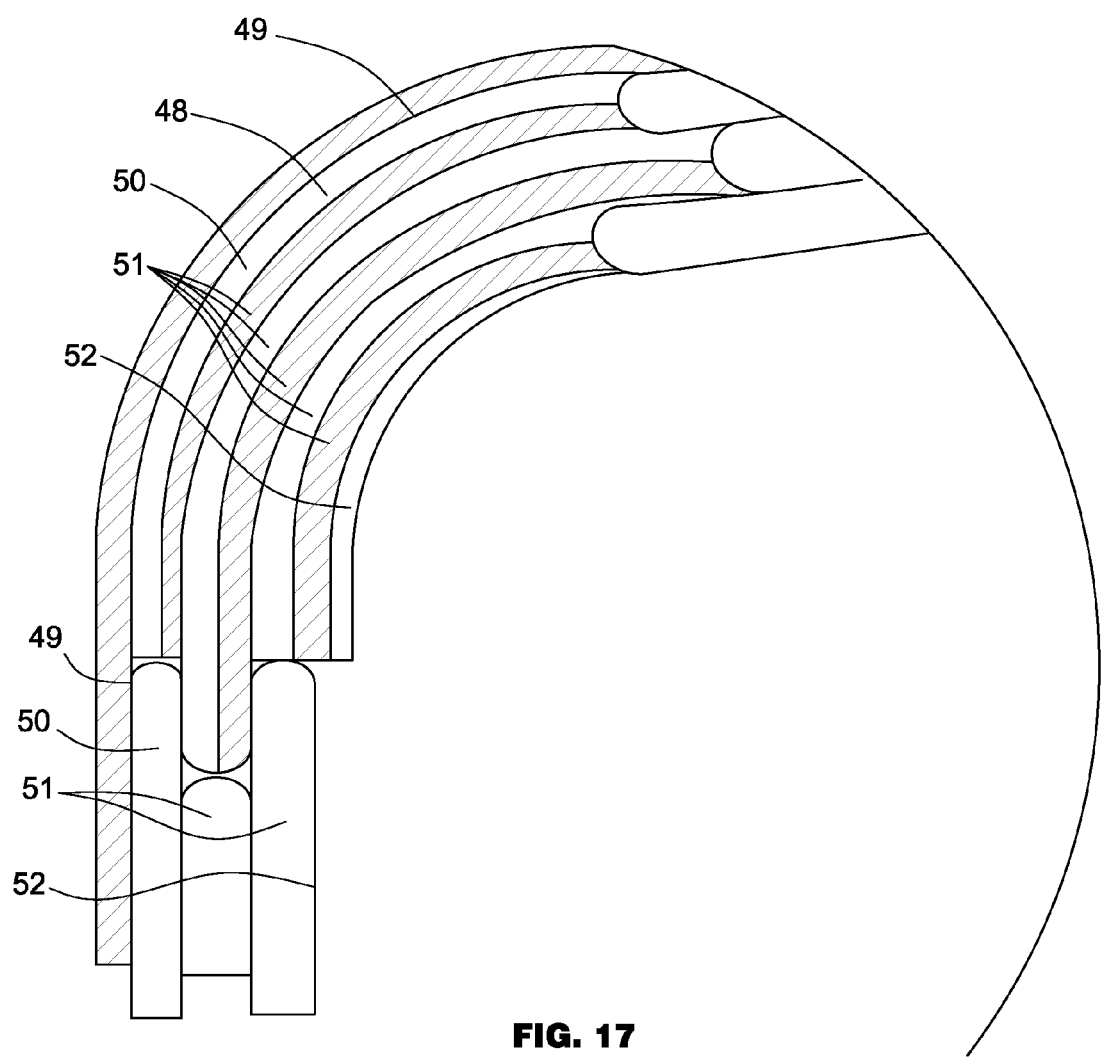
Figure 17A:
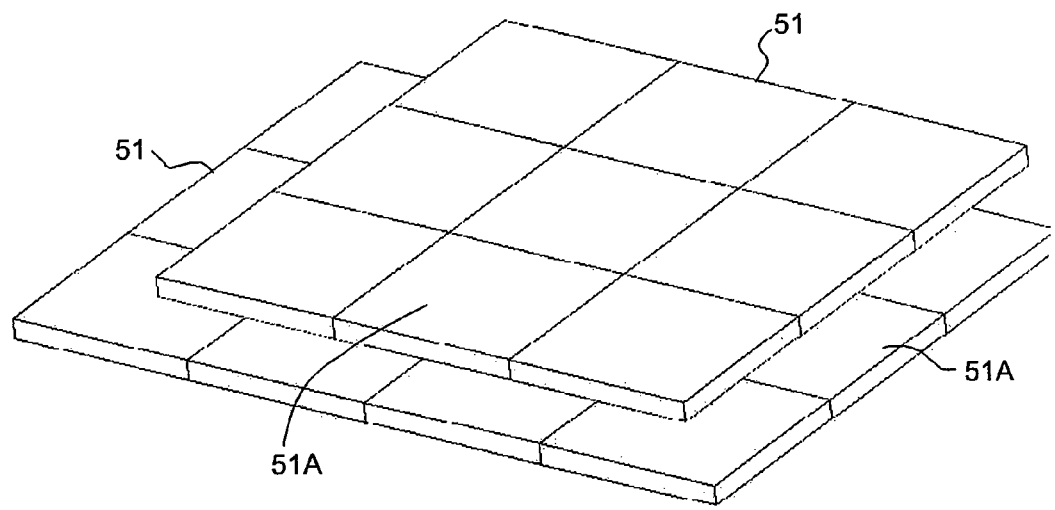
Figure 18:
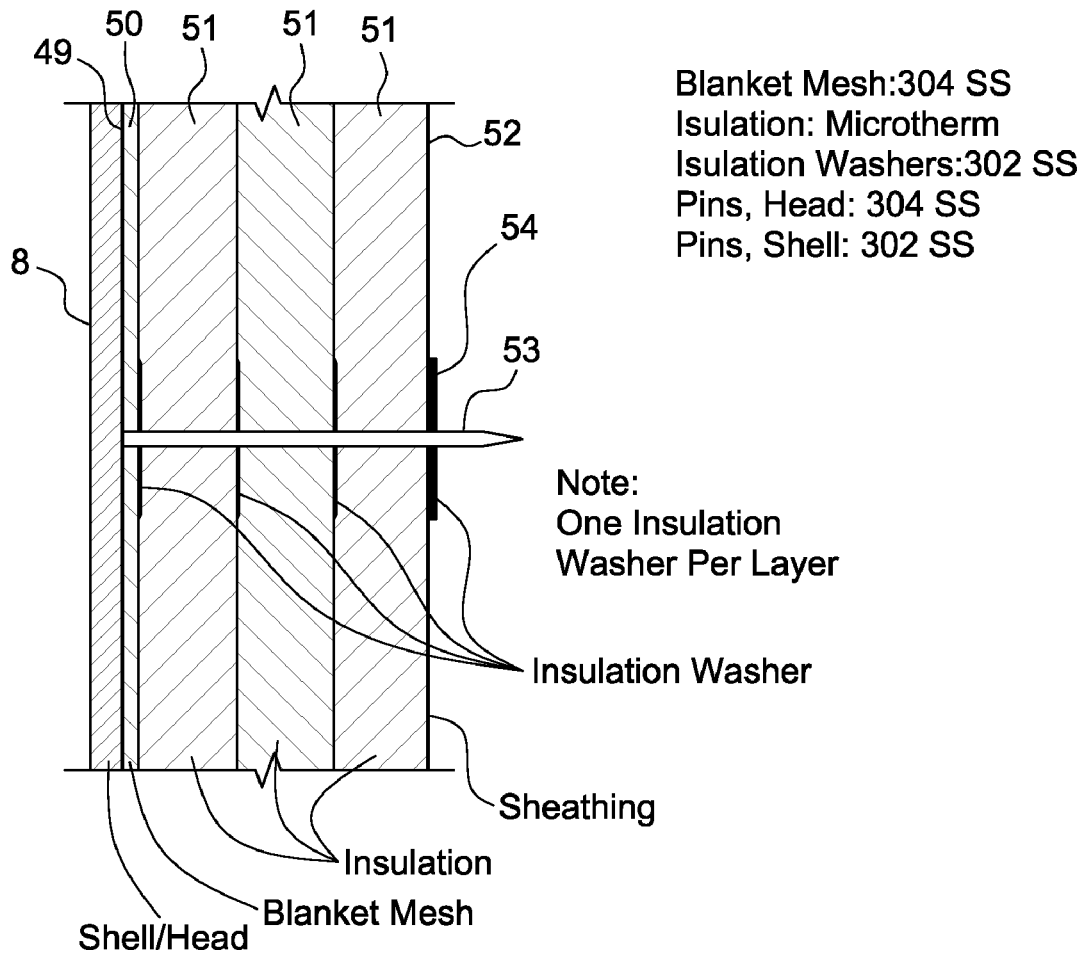
Figure 19:
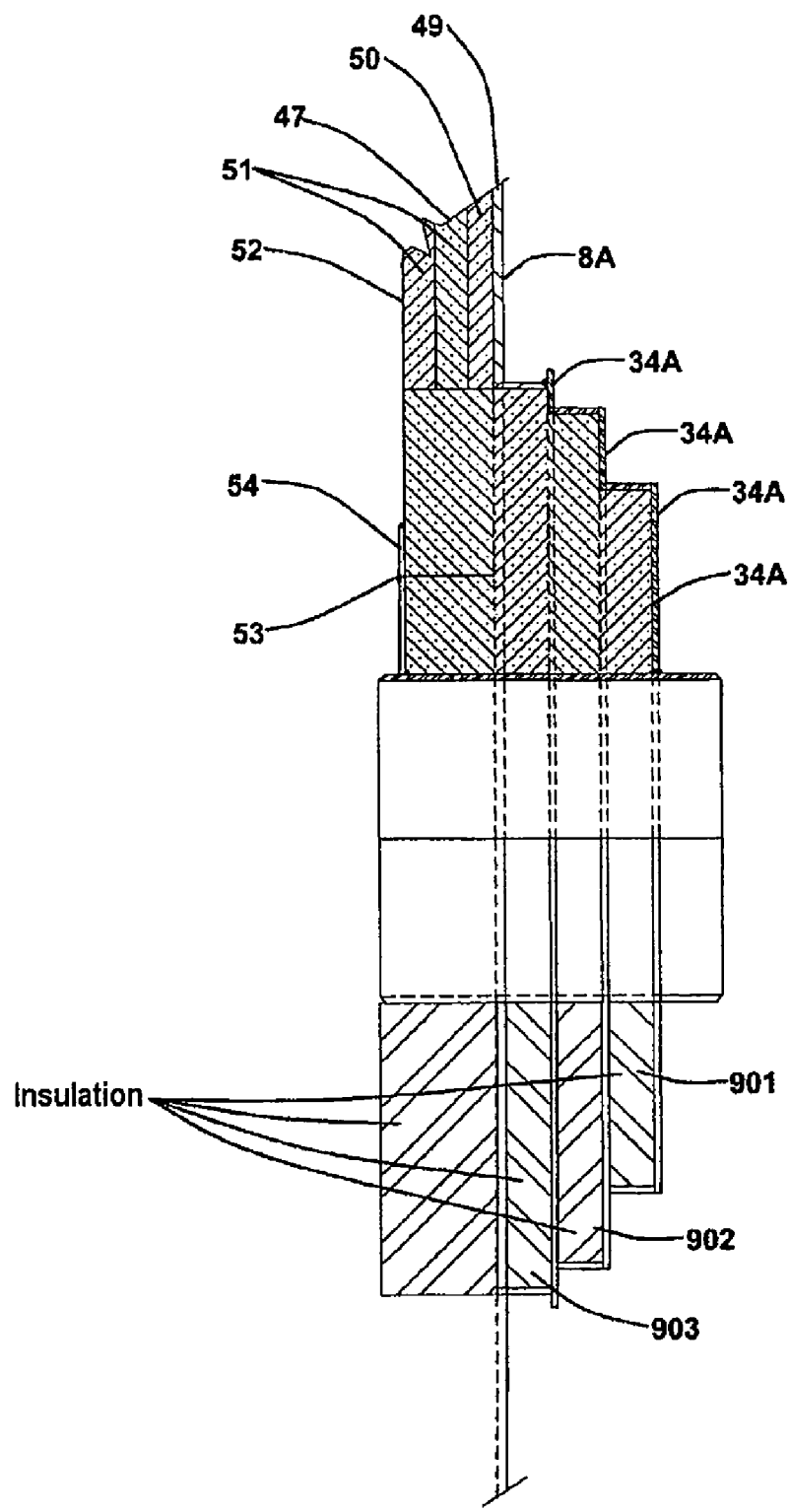

As shown in FIG. 17A, the thermal insulation layers 51 each comprise thermal insulation segments 51A which are abutted against each other to form the layer. The segments of successive layers are furthermore staggered or off-set from each other. As seen in FIGS. 18 and 19, pins 53 are passed through the layers of the assemblies 47 and 48 and are attached as by welding to the inner surface of the enclosure. Clips 54 are used to secure the segments 47 and 48 to the pins 53. While a clip 54 can be provided to secure each segment of a layer to a pin, to decrease the amount of heat loss carried by the pin clip configuration, the number of pins can be decreased by allowing a segment in a layer to be secured by an overlapping clipped segment of an outer layer.

With the assemblies 47 and 48 configured as above-described, the heat generated in the upper enclosure 8 is prevented from reaching the outer surface of the enclosure. Thus temperatures of approximately 1200° F. in the interior of the enclosure, which are typical temperatures where the fuel stacks 2-5 are molten carbonate fuel stacks, can be reduced to approximately 100° F. at the outer wall of the enclosure.

Maintenance of the outer surface of the upper enclosure at this lower temperature is also facilitated by the thermally insulated stepped transitions of the nozzles in the upper enclosure as previously discussed and shown in FIG. 19. This insulation insulates the piping carrying hot oxidant and fuel to and from the enclosure from the being affected by the hot gases, thereby maintaining the outer surface temperature of the enclosure at the lower temperatures.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A fuel cell assembly comprising:
a plurality of fuel cells arranged in a stack, said stack having first and second opposing faces for receiving fuel gas and expelling exhausted fuel gas, respectively, and third and fourth opposing faces for receiving oxidant gas and expelling exhausted oxidant gas, respectively;
first and second manifolds abutting said second and fourth faces;
an end plate assembly abutting the fuel cell at an end of said stack, said end plate assembly having an inlet area adapted to receive an exhaust gas from said stack, an outlet area and a passage connecting said inlet area and outlet area and adapted to carry said exhaust gas received at said inlet area from said inlet area to said outlet area; and
a further end plate assembly abutting the fuel cell at a further end of said stack opposing said end, said further end plate assembly having a further inlet area adapted to receive a further exhaust gas from said stack, a further outlet area and a further passage connecting said further inlet area and further outlet area and adapted to carry said further exhaust gas received at said further inlet area from said further inlet area to said further outlet area;
wherein said exhaust gas is oxidant exhaust gas and said further exhaust gas is fuel exhaust gas; and
wherein said first manifold communicates with said inlet area of said end plate assembly and said second manifold communicates with said further inlet area of said further end plate assembly.

2. A fuel cell assembly in accordance with claim 1, wherein:
said further end plate assembly has another inlet area adapted to receive fuel, another outlet area and another passage connecting said another inlet area and another outlet area and adapted to carry fuel received at said another inlet area from said another inlet area to said another outlet area.

3. A fuel cell assembly in accordance with claim 2, wherein:
and said fuel cell stack assembly further comprises: a third manifold abutting said first face; and
wherein said third manifold communicates with said another outlet area of said further end plate assembly.

4. A fuel cell assembly in accordance with claim 3, wherein:
said first manifold overlaps with said inlet area of said end plate assembly, said third manifold overlaps with said another outlet area of said further end plate assembly, and said second manifold overlaps with further inlet area of said further end plate assembly.

5. A fuel cell assembly in accordance with claim 1, wherein:
said first manifold overlaps with said inlet area of said end plate assembly and said second manifold overlaps with further inlet area of said further end plate assembly.

6. A fuel cell assembly in accordance with claim 1, wherein:
said end plate assembly and said further end plate assembly each comprise a hollow body having upper and lower walls and a number of side walls connecting the upper and lower walls.

7. A fuel cell assembly comprising:
a plurality of fuel cells arranged in a stack;
an end plate assembly abutting the fuel cell at an end of said stack, said end plate assembly having an inlet area adapted to receive an exhaust gas from said stack, an outlet area and a passage connecting said inlet area and outlet area and adapted to carry said exhaust gas received at said inlet area from said inlet area to said outlet area;
a further end plate assembly abutting the fuel cell at a further end of said stack opposing said end, said further end plate assembly having a further inlet area adapted to receive a further exhaust gas from said stack, a further outlet area and a further passage connecting said further inlet area and further outlet area and adapted to carry said further exhaust gas received at said further inlet area from said further inlet area to said further outlet area;
wherein:
said end plate assembly and said further end plate assembly each comprise a hollow body having upper and lower walls and a number of side walls connecting the upper and lower walls;
said inlet area is in a first side wall of said hollow body of said end plate assembly and said outlet area is in a second side wall of said hollow body of said end plate assembly, and said passage of said end plate assembly is defined by the interior of said body of said end plate assembly;
said further inlet area is in a first side wall of said hollow body of said further end plate assembly and said further outlet area is in a second side wall of said hollow body of said further end plate assembly, and said passage of said further end plate assembly is defined by the interior of said body of said further end plate assembly.

8. A fuel cell assembly in accordance with claim 7, further comprising:
a terminal affixed to said upper wall of the hollow body of said end plate assembly adapted to function as an electrical output terminal for said stack; and
a further terminal affixed to said lower wall of the hollow body of said further end plate assembly adapted to function as an electrical output terminal for said stack.

9. A fuel cell assembly in accordance with claim 7, wherein:
said first and second side walls of the hollow body of said end plate assembly oppose one another; and
said first and second side walls of the hollow body of said further end plate assembly are transverse to one another.

10. A fuel cell assembly in accordance with claim 7, further comprising:
said stack has first and second opposing faces for receiving fuel gas and expelling exhausted fuel gas, respectively, and third and fourth opposing faces for receiving oxidant gas and expelling exhausted oxidant gas, respectively
and said fuel cell assembly further comprises: first and second manifolds abutting said second and fourth faces; and
wherein said first manifold overlaps with said inlet area of said end plate assembly and said second manifold overlaps with said further inlet area of said further end plate assembly.

11. A fuel cell assembly in accordance with claim 10, further comprising:
a terminal affixed to said upper wall of the hollow body of said end plate assembly adapted to function as an electrical output terminal for said stack; and a further terminal affixed to said lower wall of the hollow body of said further end plate assembly adapted to function as an electrical output terminal for said stack.

12. A fuel cell assembly in accordance with claim 7, wherein:
said further end plate assembly has another inlet area adapted to receive fuel, another outlet area and another passage connecting said another inlet area and another outlet area and adapted to carry fuel received at said another inlet area from said another inlet area to said another outlet area.

13. A fuel cell assembly in accordance with claim 12, wherein:
said another inlet area is in the second side wall of said hollow body of said further end plate assembly and said another outlet area is in a third side wall opposing said first side wall of said hollow body of said further end plate assembly.

14. A fuel cell assembly in accordance with claim 13, wherein:
said stack has first and second opposing faces for receiving fuel gas and expelling exhausted fuel gas, respectively, and third and fourth opposing faces for receiving oxidant gas and expelling exhausted oxidant gas, respectively
and said fuel cell stack assembly further comprises: first, second and third manifolds abutting said first, second and fourth faces; and
wherein said third manifold overlaps with said inlet area of said end plate assembly, said first manifold overlaps with said another outlet area of said further end plate assembly, and said second manifold overlaps with further inlet area of said further end plate assembly.

15. A fuel cell assembly in accordance with claim 13, wherein:
said first and second side walls of the hollow body of said end plate assembly oppose one another; and
said first and second side walls of the hollow body of said further end plate assembly are transverse to one another; and
said second and third side walls of the hollow body of said further end plate assembly are transverse to one another.

16. A fuel cell assembly in accordance with claim 15, wherein:
said stack has first and second opposing faces for receiving fuel gas and expelling exhausted fuel gas, respectively, and third and fourth opposing faces for receiving oxidant gas and expelling exhausted oxidant gas, respectively
and said fuel cell stack assembly further comprises: first, second and third manifolds abutting said first, second and fourth faces; and
wherein said third manifold overlaps with said inlet area of said end plate assembly, said first manifold overlaps with said another outlet area of said further end plate assembly, and said second manifold overlaps with further inlet area of said further end plate assembly.

17. A fuel cell assembly in accordance with claim 16, further comprising:
a terminal affixed to said upper wall of the hollow body of said end plate assembly adapted to function as an electrical output terminal for said stack; and
a further terminal affixed to said lower wall of the hollow body of said further end plate assembly adapted to function as an electrical output terminal for said stack.

* * * * *